United States Patent
Holzaepfel et al.

(10) Patent No.: US 8,369,966 B2
(45) Date of Patent: Feb. 5, 2013

(54) CONTROLLER NETWORK AND METHOD FOR TRANSMITTING DATA IN A CONTROLLER NETWORK

(75) Inventors: Matthias Holzaepfel, Stuttgart (DE); Reinhard Sperrer, Ostfildern (DE); Stefan Woehrle, Ostfildern (DE); Klaus Wohnhaas, Fellbach (DE)

(73) Assignee: Pilz GmbH & Co. KG, Ostfildern (DE)

( * ) Notice: Subject to any disclaimer, the term of this patent is extended or adjusted under 35 U.S.C. 154(b) by 383 days.

(21) Appl. No.: 12/842,367

(22) Filed: Jul. 23, 2010

(65) Prior Publication Data

US 2011/0016362 A1 Jan. 20, 2011

Related U.S. Application Data

(63) Continuation of application No. PCT/EP2009/000283, filed on Jan. 17, 2009.

(30) Foreign Application Priority Data

Jan. 25, 2008 (DE) .......................... 10 2008 007 672

(51) Int. Cl.
G05B 9/02 (2006.01)
(52) U.S. Cl. ............ 700/79; 700/14; 700/306; 702/176; 702/183; 714/55; 370/252; 375/225
(58) Field of Classification Search .................... 700/14, 700/79, 306; 702/176, 183; 714/55; 370/241, 370/252; 375/224, 225
See application file for complete search history.

(56) References Cited

U.S. PATENT DOCUMENTS

| 7,366,774 | B2 | 4/2008 | Gibart et al. |
| 2005/0081117 | A1 | 4/2005 | Gibart |
| 2006/0171326 | A1* | 8/2006 | Durand et al. ................ 370/252 |
| 2007/0115850 | A1* | 5/2007 | Tsuchiya et al. .............. 370/252 |
| 2008/0002737 | A1 | 1/2008 | Schwenkel et al. |

FOREIGN PATENT DOCUMENTS

| DE | 103 61 178 A1 | 12/2004 |
| DE | 10 2005 032 877 A1 | 5/2006 |
| EP | 1 610 499 A2 | 12/2005 |
| EP | 1 521 145 A1 | 4/2006 |
| WO | WO 2006/069691 A1 | 7/2006 |

OTHER PUBLICATIONS

XP-002522879, Fachausschuss "Elektrotechnik": Grundsatz für die Prüfung und Zertifizierung von "Bussystemen für die Übertragung sicherheitsrelevanter Nachrichten" May 2002, pp. 1-34.
European Committee for Standardization, EN 954-1, Safety-related parts of control systems, Mar. 1997, pp. 1-32.
Functional safety and IEC 61508; Sep. 2005; 13 pages.
European Committee for Standardization, EN ISO 13849-1, Safety of machinery—Safety-related parts of control systems—Part 1: General principles for design, Nov. 2006, pp. 1-85.

* cited by examiner

*Primary Examiner* — Sean Shechtman
(74) *Attorney, Agent, or Firm* — Harness, Dickey & Pierce, P.L.C.

(57) ABSTRACT

A network having a plurality of subscribers has at least one message transmitter and at least one message receiver. The at least one message transmitter sends messages at predefined time intervals. The message receiver receives the messages at the predefined time intervals. A delay time of the messages is monitored on the basis of time outs. In addition, at least one of the subscribers repeatedly estimates a current delay time using a time measurement between sending out a request message and receiving a response message. The estimated delay time is compared with a predefined threshold value. If the estimated delay time exceeds the defined threshold value, an error signal is generated.

20 Claims, 3 Drawing Sheets

CONTROLLER NETWORK AND METHOD FOR TRANSMITTING DATA IN A CONTROLLER NETWORK

CROSS REFERENCES TO RELATED APPLICATIONS

This application is a continuation of international patent application PCT/EP2009/000283 filed on Jan. 17, 2009 designating the U.S., which international patent application has been published in German language and claims priority from German patent application DE 10 2008 007 672.4 filed on Jan. 25, 2008. The entire contents of these priority applications are incorporated herein by reference.

BACKGROUND OF THE INVENTION

The present invention relates to a controller network and to a method for transmitting data in such a controller network, and more particularly to a controller network and a method, where delay times of the messages are monitored in order to guarantee that safety-relevant data is transmitted and received within predefined time intervals.

DE 10 2005 032 877 A1 discloses a method for time synchronization of subscribers in a network for automated control of a technical installation. The subscribers interchange safety-relevant data, with the term "safety-relevant" referring to the operational safety of the installation. A typical example is the transmission of a message that signals actuation of an emergency-off switch. In order to ensure the operational safety, the installation must be switched off within a defined time period in response to such a message. In order to ensure compliance with this defined time period, it is necessary to monitor the delay time of the messages in the network. The delay time may vary because of the number of messages varying, because of external interference, or for other reasons. While delaying messages in an office network may not have any serious consequences apart from possibly inconvenient waiting time, the delay of messages in a network that is used for safety-relevant control of an installation can have fatal consequences, for example if a dangerous drive is not switched off in good time because of the delay.

Coping with message delays is a prerequisite for certification of a network intended to be accepted for transmission of safety-relevant messages within the meaning of the Standards EN 954-1, IEC 61508 and EN ISO 13849-1. Measures for coping with delays are described in the document "Prüfgrundsätze für Bussysteme für die Übertragung sicherheitsrelevanter Nachrichten" [Test principles for bus systems for transmission of safety-relevant messages], which was issued as document GS-ET-26 by the Fachausschuss Elektrotechnik des Hauptverbandes der gewerblichen Berufsgenossenschaften [Specialist Committee for Electrical Engineering within the Federation of Industrial Trade Associations] in Germany. According to this document, a time out is generally required. Time out means that the receiver expects to receive messages within defined time intervals, and it produces an error message if the expected message does not arrive within the defined time interval. The time out criterion and the length of the time out interval, however, must include a certain tolerance time in order to prevent an error signal from being produced merely in the event of minor, non-problematic fluctuations in the delay time.

However, a time out criterion at the message receiver is, per se, not sufficient in order to cope with message delays within a controller network, if the message receiver cannot check how up-to-date a message is when the message arrives at an expected time. It is possible that the message receiver receives a message meeting its time out criterion, but this message originates from a very much older message cycle, and, therefore, the message must not be used as a substitute for an expected up-to-date message which has actually not been received. The message receiver cannot identify this on the basis of its time out alone.

Therefore, there are two fundamental concepts for coping with the delay of messages in a network in practical applications. The first concept uses a second time out at the message transmitter, i.e. the message transmitter waits for a confirmation message (acknowledge) within a defined time interval after sending its message. The combination of time out and acknowledge is implemented, for example, in the PROFIBUS and PROFINET/PROFIsafe communication networks from the Siemens Company, Germany, in the EtherCAT communication network from the Beckhoff Company, Germany, or the SafetyBUS p communication network from the present applicant.

An alternative concept includes the use of so-called time stamps in addition to the time out at the receiver end. In this case, each transmitted message is provided with a time stamp, on the basis of which a message receiver can determine when the message transmitter actually sent the message. Use of time stamps, however, requires that the clocks in the message transmitter and the message receiver are running synchronously. Accordingly, all the subscribers must have clocks which are synchronized before communication and at regular time intervals.

One known method for time synchronization is described in the Standard IEEE-1588. According to this method, a master subscriber sends a plurality of synchronization messages which contain time stamps generated by the master subscriber on the basis of its own clock. A slave subscriber can use the time stamps to determine the time difference between its own clock and the master subscriber clock. However, this difference still includes the delay time of the synchronization messages. The slave subscriber therefore sends a request message to the master subscriber, and, with the aid of its own clock, it measures the time period until it receives a response message from the master subscriber. The slave subscriber determines the delay time of the messages by dividing the measured time period by two. The slave subscriber then corrects its clock by the time difference and by the delay time of the messages. By way of example, the DeviceNet communication network from the Rockwell Company, USA, uses time stamps and time synchronization.

Clock synchronization is complex because it requires repeated communication between the master subscriber and the slave subscribers. Furthermore, for safety-relevant applications, the synchronization must be monitored, and this represents further complexity. In addition, a portion of the transmission capacity of the network is constantly occupied for the transmission of the time stamps.

The use of time out criteria at the transmitter end loads the network with a plurality of acknowledge messages. Therefore, the transmission capacity of the network is negatively affected as well. Furthermore, this approach requires that every message transmitter must know its message receiver in order to allow it to wait for the acknowledgment. This necessitates a high level of configuration complexity for setting up the network and for replacing, adding or removing subscribers.

Above mentioned DE 10 2005 032 877 A1 discloses a method for time synchronization of subscribers in a network, wherein the message receivers periodically check the time information from all the connected message transmitters. In contrast to IEEE 1588, time synchronization is in this case initiated by the individual message receivers. Even if the synchronization were to be simplified in this way, the disadvantage still exists that all the messages must be provided with time stamps. Furthermore, the time synchronization is not reliably monitored in this case.

SUMMARY OF THE INVENTION

Against this background, it is an object of the present invention to provide a method for transmitting data in a controller network and a controller network, where message delays are coped with in a more efficient manner.

It is another object to provide a method for transmitting data in a controller network and a controller network having an improved transmission capacity while measures for avoiding excessive message delays are implemented.

According to an aspect of the invention, in a controller network for automated control of a technical installation, the controller network having a plurality of subscribers comprising a number of sensor devices, actuator devices and controllers controlling the actuator devices in response to messages from the sensor devices, with each subscriber acting as at least one of message transmitter and message receiver, and with at least one actuator device having an activated first state representing a hazardous situation and a deactivated second state representing a non-hazardous situation, this object is achieved by a method for transmitting control data from a message transmitter to a message receiver, the method comprising: the message transmitter sends control messages containing the control data repeatedly with a first repetition rate; the message receiver receives the plurality of control messages and monitors delay times of the control messages using a time out criterion based on the first repetition rate; during control of the installation, a first subscriber additionally monitors the delay times by repeatedly sending a request message to a second subscriber, and by measuring time periods between sending of the request message and receiving of a response message from said second subscriber; wherein the first subscriber compares the measured time periods with a defined threshold value, and produces an error signal if a number of the measured time periods exceed the defined threshold value; and wherein the at least one actuator device enters into the deactivated second state in response to the error signal.

According to another aspect of the invention, there is provided controller network for automatically controlling an installation, comprising: a plurality of subscribers comprising a number of sensor devices, actuator devices and controllers controlling the actuator devices in response to messages from the sensor devices, with each subscriber acting at least as one of message transmitter and message receiver, and with at least one actuator device having an activated first state representing a hazardous situation and a deactivated rest state representing a non-hazardous situation, a message transmitter configured for sending control messages containing control data repeatedly within defined first time intervals, a message receiver configured for receiving the plurality of control messages and for monitoring delay times of the control messages using a time out criterion based on the first time intervals, a first subscriber configured for further monitoring the delay times by repeatedly sending a request message, a second subscriber configured for receiving the request message and for producing a response message in response thereto, wherein the first subscriber is configured for repeatedly measuring time periods between sending of the request message and receiving of the response message, wherein the first subscriber is configured for comparing the measured time periods with a defined threshold value, and for producing an error signal if a number of the measured time periods exceed the defined threshold value, and wherein the at least one actuator device is configured to enter into the deactivated rest state in response to the error signal.

According to yet another aspect, there is provided a method for transmitting data in a controller network having a plurality of subscribers, which include at least one message transmitter and at least one message receiver, wherein the at least one message transmitter sends a plurality of messages within regular first time intervals, wherein the at least one message receiver receives the plurality of messages, wherein the at least one message receiver monitors a delay time of the messages using a time out criterion based on the regular time intervals, and wherein at least one of the subscribers further monitors the delay time of the messages by repeatedly sending a request message requesting a response message and by measuring a time period until the response message is received, said at least one subscriber comparing the measured time period with a predefined threshold value, and said at least one subscriber generating an error signal if the measured time period exceeds the predefined threshold value a predefined number of times.

The novel method and the novel network use test measurements in order to check if the delay time of the messages in the network is less than a defined threshold value. This does not necessarily mean that the delay times are determined exactly, provided that the measured delay time cannot be shorter than the actual delay time. The term "measurement" should therefore be understood in the sense of estimation or limit-value analysis, but not necessarily in the sense of an exact measurement determination of the actual delay time. On the other hand, the term "measurement" indicates that the estimate is produced on the basis of current values which are repeatedly measured during operation of the network.

The test measurement is preferably carried out by the at least one subscriber sending a request message to another subscriber, and in this way requesting a response message. The at least one subscriber measures the time period until it receives the response message, and it uses measured time period in order to estimate the maximum delay time. In contrast to the method according to IEEE 1588, this test measurement is not required for the synchronization of clocks, but the measured delay time itself is compared with a threshold value. In principle, it is nevertheless still possible to synchronize clocks, even though this is not done in preferred refinements of the novel method and of the novel device.

The test measurement makes it possible to estimate the actual maximum delay time of the messages in the network. In contrast to the previous assumptions, this is sufficient to cope with message delays in the network if it is in addition to a time out at the receiver end. A major, sudden increase in the delay time which, for example, can be caused by a line interruption, is identified at the receiver end on the basis of the time out. The primary problem is therefore the basic delay time of a message from a message transmitter to the message receiver. The receiver should know this delay time in order to be in the position to determine whether or not a received message is up to date. As already mentioned, it is not important to have the exact value of the actual delay time. Rather, it is sufficient if the receiver can be sure that the actual delay time does not exceed the threshold value, as a result of which the received message must be up to date. In other words, the message receiver just needs to know the delay time from the set-up of the communication network (the so-called initial delay) in order to be able to determine whether or not a received message is up to date.

Furthermore, however, it is necessary to monitor whether the initial delay is gradually becoming longer during operation of the network since, otherwise, there is a risk of the message receiver processing old messages. A gradual increase in the message delay times can be monitored by carrying out test measurements at predefined time intervals. It is therefore sufficient, in addition to the time out at the receiver end, to carry out test measurements of the message delay time within defined (first) time intervals. The length of these time intervals can either be determined empirically and/or can be determined on the basis of analytical considerations for a specific network. One criterion is that the defined (first) time intervals must at most be so long that the delay time cannot increase above the maximum permissible delay time during operation without this being identified on the basis of the time out used at the receiver end.

In principle, the novel method and the novel device require neither time stamps in the messages nor time synchronization between the subscribers. Furthermore, in principle, no further time out is required at the transmitter end and, accordingly, transmitted messages can be sent without the message transmitter having to wait for a confirmation message. The transmission capacity of the network can therefore be used more efficiently for payload data transmission. Furthermore, the novel method and the novel device make it possible to use the producer-consumer principle, according to which a message transmitter makes its messages available to all the "interested" receivers, and all the receivers themselves select the messages which are relevant to them. This makes it possible to operate the network with little administration effort.

Overall, the novel method and the novel network make it possible to cope easily and efficiently with message delays in a communication network, with the transmission capacity of the network being adversely affected only to a minor extent, and by occasional measurement messages. The above mentioned object is therefore completely achieved.

In a preferred refinement, the first subscriber sends the request message with a second repetition rate, with the first repetition rate being higher than the second repetition. In another refinement, the at least one subscriber sends the request messages at predefined second time intervals, which are longer than the regular first time intervals. The message transmitter preferably sends the control messages periodically.

In these refinements, the test measurement is carried out only "occasionally", i.e. messages transmitting payload data are sent more frequently and at shorter time intervals than the test messages. This refinement allows the transmission capacity to be used even more efficiently.

In a further refinement, the length of the first time intervals and/or the repetition rate varies depending on the measured delay time.

In this refinement, the frequency of the test messages is determined depending on the currently estimated delay time. If the delay time is relatively long, the test measurement must be carried out at shorter time intervals in order to identify in good time that the required reaction time of the system has been exceeded. In contrast, if the delay time (in particular the initial delay) is short, it is sufficient to carry out the test measurements at longer time intervals. This refinement has the advantage that the frequency of the test measurements is matched to different environmental conditions. The transmission capacity of the network is adversely affected even less.

In a further refinement, the at least one subscriber monitoring the delay times (in addition to the time out criterion at the receiver side) is a message receiver.

In this refinement, the test measurement is carried out by the message receiver. This refinement is advantageous because the message receiver monitors the reception of the transmitted message using its time out anyway. The message receiver therefore knows its individual time-out tolerance. The frequency of the test measurements, i.e. the length of the first time intervals, is advantageously determined depending on this time-out tolerance, with the first time intervals being chosen to be shorter when the time-out tolerance is greater. Specifically, if the time-out tolerance is wide, the delay time of the messages can increase relatively quickly without this being identified on the basis of the time out. In contrast, if the time-out tolerance is narrow, a gradual increase in the delay time requires a large number of communication cycles, and it is sufficient to carry out the test measurements at relatively long time intervals. Since the message receiver knows its time-tolerance, the frequency of the test measurements can be determined optimally with little administration effort.

In a further refinement, the plurality of subscribers include a plurality of message transmitters whose messages are received by the message receiver, wherein the message receiver measures the delay times of the messages from the plurality of message transmitters, and it compares the measured delay times with associated threshold values.

In this refinement, the at least one subscriber carries out test measurements relating to a majority, or even relating to all message transmitters, from which it receives messages. This refinement allows further optimization of the transmission capacity while complying with stringent safety requirements, since the frequency of the test measurements can be matched to the individual message delay times of the individual messages.

In a further refinement, each message receiver measures the delay time of the messages received by it.

In this refinement, each message receiver measures "its" relevant delay times. Each message receiver preferably carries out test measurements relating to all the message transmitters from which it receives messages. This refinement allows optimum monitoring of the message delay times for all the communication paths which are used within the network. This refinement therefore allows very high safety. On the other hand, the frequency of the test measurements can be matched to the individual delay times of the individual communication paths, thus allowing very efficient use of the transmission capacity.

In a further refinement, the plurality of subscribers include a number of sensor devices, actuator devices and controllers, which are each in the form of message receivers. The devices are furthermore preferably also in the form of message transmitters, since this allows very flexible and efficient communication based on the producer-consumer principle.

The novel monitoring of the message delay times is in principle possible for any type of communication network. The advantages of the novel method and of the novel device are, however, particularly evident when the network is used for communication between devices which are used for automated control of a technical installation. Compliance with defined message delay times is of major importance in such applications.

In a further refinement, the sensor devices, actuator devices and controllers have a state which is defined as safe and which is activated depending on the error signal.

For the purposes of this refinement, a safe state leads to the controlled installation being brought to a non-dangerous state. For a sensor device which evaluates an emergency-off button, the safe state is, for example, a signal which signals that an emergency-off button has been operated. For an actuator device, the safe state is the deactivated rest state. For a controller, the safe state is that which brings the connected actuator devices to their safe state. It is advantageous if the devices mentioned above each also assume their safe state when the time out is not satisfied, i.e. when an expected transmitted message has not been received within the time out.

According to this refinement, the devices assume their safe state when they find, using the test measurements, that the delay time has exceeded the defined threshold value. In principle, it is possible and even advantageous if a "failed" test measurement is first of all repeated before the safe state is activated. This improves the availability of the installation. However, in this case, it is important that the length of the first time intervals is chosen such that the reaction time of the system is still complied with after a "failed" delay time measurement. In the end, the criterion for producing the error signal is that at least one successful test measurement must have been occurred within a defined number of communication cycles, where successful test measurement requires that the measured delay time is below the defined threshold value. With the present refinement, a communication network for transmitting safety-relevant data can be established very efficiently and with little administration effort.

In a further refinement, only the message receivers monitor the delay time of the messages on the basis of time outs.

In this refinement, there is no time out at the transmitter end. Accordingly, the message transmitters do not require any confirmation messages. Dispensing with confirmation messages allows very efficient use of the available transmission capacity.

In a further refinement, the at least one message transmitter sends the plurality of messages without time stamps.

This refinement also contributes to increased efficiency of the novel method and of the novel device, because the transmission capacity is not adversely affected by sending time stamps. Furthermore, there is no need for complex time synchronization between the subscribers in this refinement.

In a further refinement, the at least one message receiver periodically sends so-called heartbeat messages in order to signal to the other subscribers in the network that the at least one message receiver is still ready to receive, wherein the heartbeat messages include a response request, and wherein the delay time is measured on the basis of the heartbeat messages and of the response messages.

Heartbeat messages which are sent periodically are advantageous in a producer-consumer network in order to signal to the message transmitters that the message receivers which were originally present are still "alive". Such heartbeat messages can be sent at considerably longer time intervals than, for example, confirmation messages, which a message receiver uses to acknowledge every received message. The advantage of the present refinement is that the test measurements for checking the delay time are coupled to the heartbeat messages. This refinement allows a very efficient implementation of the novel method and of the novel device.

In a further refinement, the network is a switched Ethernet network, wherein the subscribers send and receive the messages using Ethernet protocols.

The novel method and the novel device can be implemented highly advantageously in a switched Ethernet network, because such a network generally allows very flexible communication between subscribers, but with the downside that the delay time of the messages is not determined. In consequence, major and unpredictable fluctuations of the delay time are generally possible. These major delay time fluctuations in an Ethernet network can be coped with easily and very efficiently by the novel method and the novel device.

It goes without saying that the features mentioned above and those which are still to be explained in the following text can be used not only in the respectively stated combination but also in other combinations or on their own without departing from the scope of the present invention.

BRIEF DESCRIPTION OF THE DRAWINGS

Exemplary embodiments of the invention will be explained in more detail in the following description and are illustrated in the drawing, in which.

DESCRIPTION OF PREFERRED EMBODIMENTS

Figure 1:
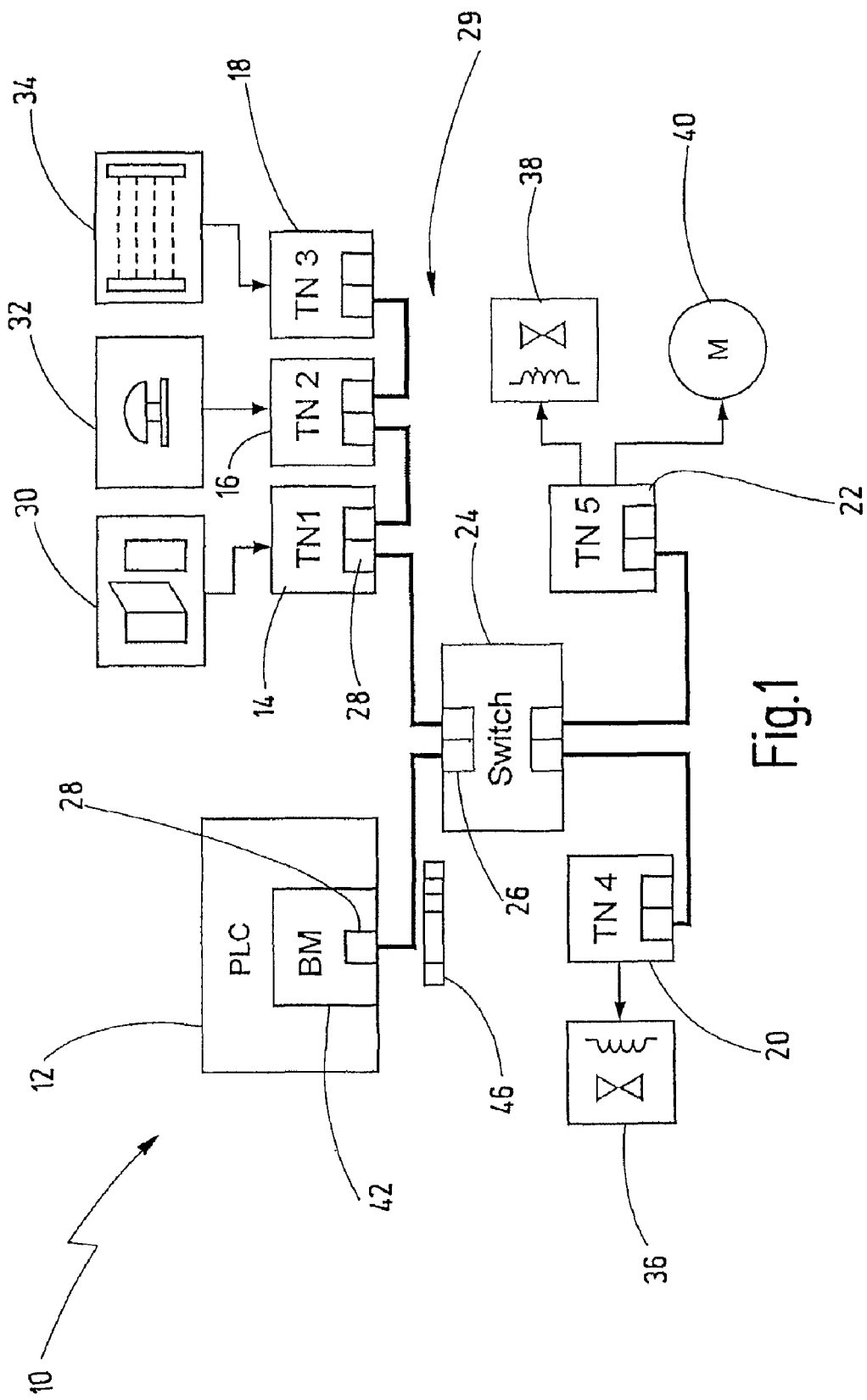
FIG. 1 shows a schematic illustration of a device which operates according to the novel method.

In FIG. 1, an exemplary embodiment of an apparatus for the control of a technical installation is designated with reference number 10. The network 10 has a controller 12, a number of sensor devices 14, 16, 18 and actuator devices 20, 22. Reference number 24 denotes a switch. Switch 24 has a plurality of connectors 26. Each device 12 to 18 has one or more connectors 28. In the illustrated exemplary embodiment, controller 12 is connected by its connector 28 to a first connector 26 of switch 24. The sensor device 14 and the actuator devices 20, 22 are connected to further connectors 26 of the switch. The further sensor devices 16, 18 are connected in series to a further connector 28 of sensor device 14. The controller 12, the sensor devices 14, 16, 18, the actuator devices 20, 22 and the switch 24 from a network 29, where messages are sent and received using Ethernet protocols. Switch 24 symbolizes that this is a switched Ethernet network, where a point-to-point link in each case exists between the individual subscribers. In principle, however, the novel method could also be used with other communication networks, including those where the subscribers are connected to one another wirelessly.

In this case, the sensor device 14 is used to monitor a guard door 30 which safeguards an automatically operating installation. Sensor device 16 monitors an emergency-off button 32 in this case, and sensor device 18 monitors a light barrier 34. It should be understood that these sensor devices are illustrated by way of example. In principle, a single sensor device could also monitor a plurality of sensors. Furthermore, the sensor devices are not restricted to the sensor devices illustrated here. However, the novel device preferably includes at least a number of sensor devices which are in the form of failsafe sensor devices in terms of Category 3 or 4 of European Standard EN 954-1, or comparable safety requirements. Such sensor devices ensure that no hazardous state of the automated installation occurs even when a malfunction occurs in the sensor device.

The actuator device 20 is used here by way of example to operate a solenoid valve 36. The actuator device 22 controls a solenoid valve 38 and a motor 40. The solenoid valves 36, 38 and the motor 40 are examples of actuators which are used in an automatically controlled installation. It should be understood that this illustration is also not exclusive and any other actuators can be operated and monitored with the aid of the novel method and the novel device. At least some actuator devices 20, 22 are preferably failsafe actuator devices in terms of Categories 3 or 4 of European Standard EN 954-1 or comparable safety requirements.

In this case, controller 12 is a programmable logic controller which is also designed to be failsafe in terms of Categories 3 or 4 of European Standard EN 954-1. However, in preferred exemplary embodiments, the controller 12 also controls standard functions of the automated installation. Reference number 42 denotes a so-called bus master which is arranged in the controller 12. The bus master 42 is a communication terminal via which the controller 12 is connected to the network 29. In preferred embodiments, the bus master 42 produces a message telegram 46 at regular (second) time intervals, and it sends these to the sensor devices 14, 16, 18 and actuator devices 20, 22. In a particularly preferred exemplary embodiment, controller 12 sends the message telegram 46 only to the first sensor device 14, and the first sensor device then passes the message telegram 46 on to the second sensor device 16, etc. In other words, the message telegram 46 is passed on from one network subscriber to the next. Once the message telegram 46 has passed through all the subscribers in series, it is sent back in the opposite sequence through the subscribers back to the controller 12. On the forward path, each network subscriber can fill defined data fields of the message telegram 46 with transmitted data. On the return path, each network subscriber can read transmitted data from other subscribers from the message telegram 46 on its way back.

Further details of this preferred method for communication of the subscribers are described in WO 2006/069691, which is incorporated herein by reference. The novel method and the novel network are, however, not restricted to this specific communication protocol, and they can also be implemented using other network protocols.

In the preferred exemplary embodiment, each device can be both a message transmitter and a message receiver, since the messages are transmitted in individually allocated data fields of the message telegram 46 on the forward path and are read from the allocated data fields in the message telegram on the backward path. In other exemplary embodiments, the transmitter and receiver roles can be assigned individually to the individual network subscribers.

Figure 2:
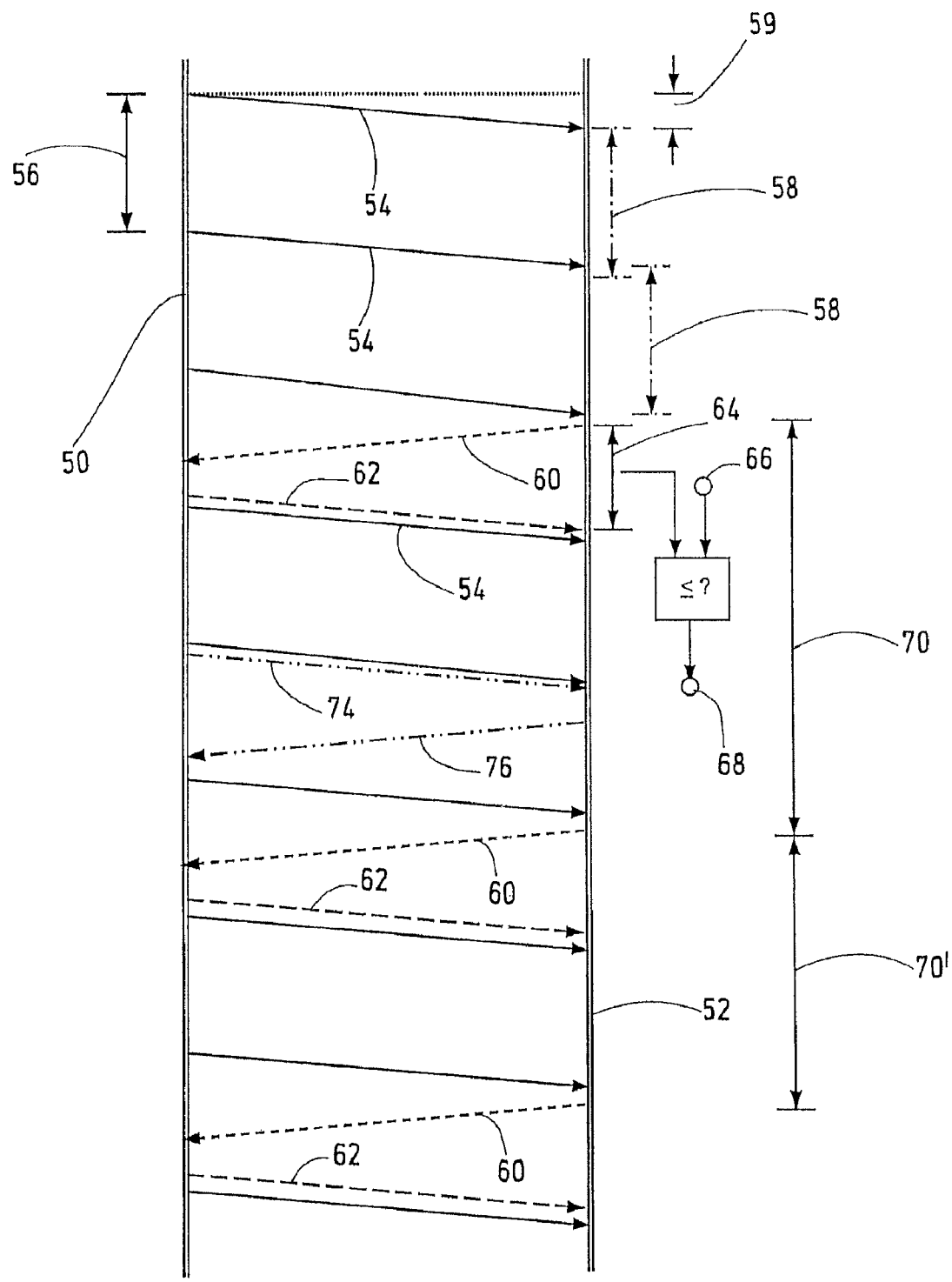
FIG. 2 shows a schematic illustration to explain an exemplary embodiment of the novel method.

FIG. 2 uses a schematic illustration to explain an exemplary embodiment of the novel method. Reference number 50 denotes a line which symbolizes a message transmitter. A second line 52 symbolizes a message receiver. Furthermore, the two lines symbolize timing, from top to bottom.

In the illustrated exemplary embodiment, the message transmitter 50 sends transmitted messages 54 at regular time intervals 56. By way of example, the message transmitter 50 is in this case the sensor device 14, and the transmitted message 54 contains information as to whether the guard door 30 is closed. The message receiver 52 is in this case, for example, the controller 12 or the actuator device 22. In principle, the transmitted messages 54 from the message transmitter 50 may be read by a plurality of receivers (producer-consumer principle).

The message receiver 52 has a time out, as is illustrated by reference number 58 in FIG. 2. The time out is a time interval within which the message receiver 52 expects to receive a current transmitted message 54. The time out interval 58 is somewhat longer than the time interval 56, in order to allow minor delay time fluctuations within the network 29 without an error signal being produced on each occasion. Reference number 54 represents the delay time of the transmitted messages.

In a preferred exemplary embodiment, the message receiver 52 itself sends heartbeat messages 60, in order to signal to the message transmitter 50 from time to time that the message receiver 52 is still "alive". In the preferred exemplary embodiment, the heartbeat message 60 furthermore contains a response request, which causes the message transmitter 50 to send a response message 62. The response message 62 may be a separate message, or it may be combined with the cyclically repeated transmitted message 54. The message receiver 52 can use the time period 64 between sending its heartbeat message 60 and receiving the response message 62 in order to estimate how long the delay time 59 of the messages is between the transmitter 50 and the receiver 52. In some exemplary embodiments, the message receiver 52 can estimate the delay time by dividing the time period 64 by two, since the time period 64 includes the combined delay time of the heartbeat message 60 and of the response message 62. In other exemplary embodiments, the message receiver 52 can use the time period 64 as an estimate of the (maximum) delay time of the messages 54.

In preferred exemplary embodiments, the message receiver 52 compares the delay time estimated on the basis of the time period 64 with a threshold value 66. If the estimated delay time exceeds the threshold value 66, an error signal 68 is produced which, in the preferred exemplary embodiments, results in the message receiver 52 assuming its safe state. For the actuator devices 20, 22, this means that the actuators 36, 38, 40 are brought to their deactivated rest state. For the sensor devices 14, 16, 18, this means that opening of the guard door 30, operation of the emergency-off button 32 or interruption of the light barrier 34 is signaled. If, in contrast, the measured delay time is below the threshold value 66, no error signal 68 is produced.

As is illustrated in FIG. 2, the message receiver 52 sends heartbeat message 60 at defined time intervals 70. The length of the defined time intervals 70 can vary in this case be varied depending on the estimated delay time, as this is illustrated by reference numbers 70, 70' in FIG. 2.

Further exemplary embodiments of the novel method and of the novel device may also include the message transmitter 50 determining the delay time of the messages in the network 29 with the aid of a measurement request message 74 and a measurement response message 76. An error signal (not illustrated here) can likewise be produced depending on the delay time determined here.

Figure 3:
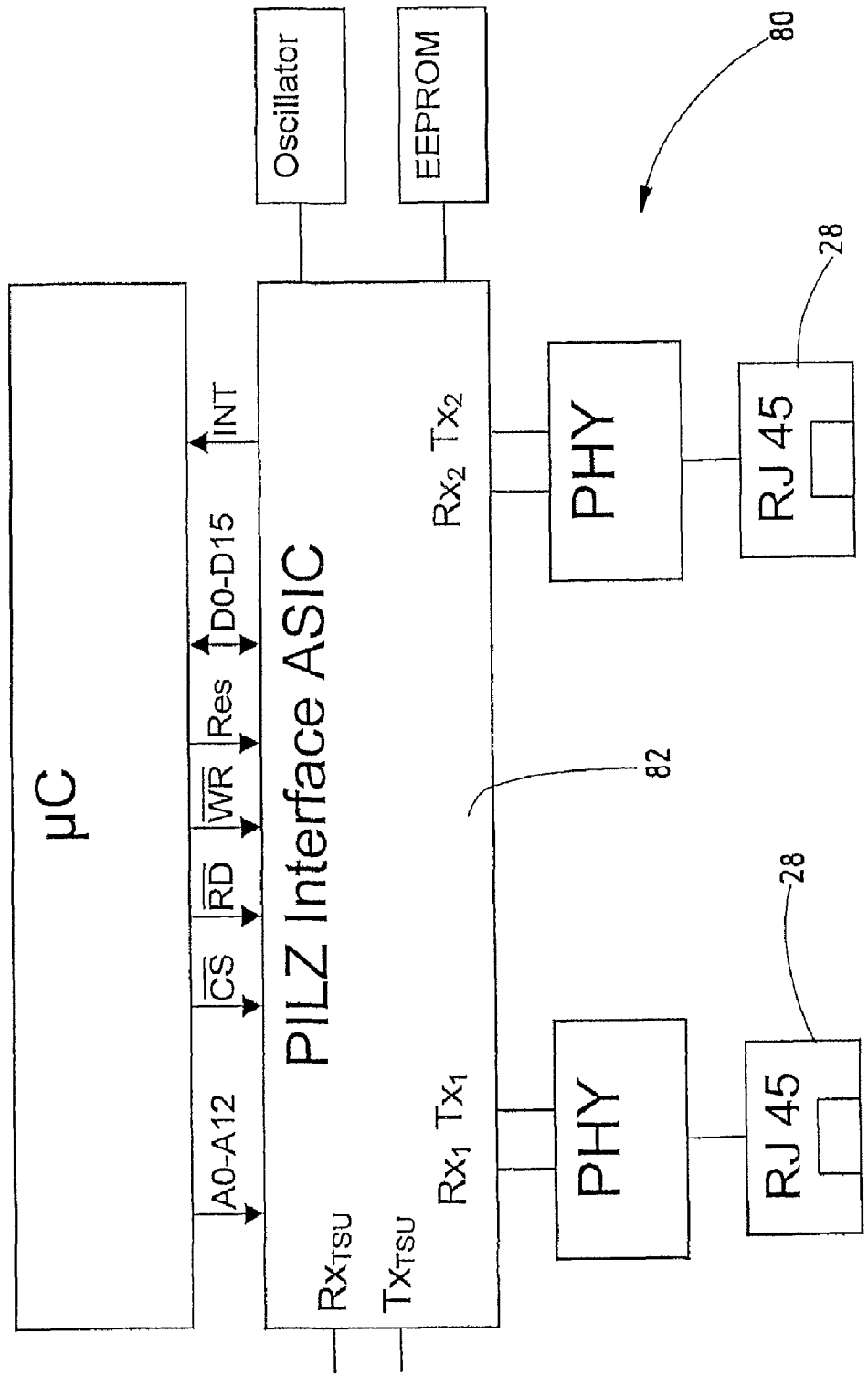
FIG. 3 shows a simplified illustration of a subscriber with a communication terminal according to an exemplary embodiment of the invention.

FIG. 3 shows a simplified illustration of a communication terminal 80 with a memory medium 82 which in this case is in the form of an ASIC. A program code is stored in the memory medium 82. The program code is designed to carry out a method of the type illustrated in FIG. 2 when the communication terminal 80 is coupled to one of the subscribers 12 to 22. The communication terminal 80 is preferably integrated in each of the subscribers 12 to 22.

What is claimed is:

1. In a controller network for automated control of a technical installation, the controller network having a plurality of subscribers comprising a number of sensor devices, actuator devices and controllers controlling the actuator devices in response to messages from the sensor devices, with each subscriber acting as at least one of message transmitter and message receiver, and with at least one actuator device having an activated first state representing a hazardous situation and a deactivated second state representing a non-hazardous situation, a method for transmitting control data from a message transmitter to a message receiver, the method comprising:

the message transmitter sends control messages containing the control data repeatedly with a first repetition rate, the message receiver receives the plurality of control messages and monitors delay times of the control messages using a time out criterion based on the first repetition rate, during control of the installation, a first subscriber additionally monitors the delay times by repeatedly sending a request message to a second subscriber, and by measuring time periods between sending of the request message and receiving of a response message from said second subscriber, wherein the first subscriber compares the measured time periods with a defined threshold value, and produces an error signal if a number of the measured time periods exceed the defined threshold value, and wherein the at least one actuator device enters into the deactivated second state in response to the error signal.

2. The method of claim 1, wherein the first subscriber sends the request message with a second repetition rate, with the first repetition rate being higher than the second repetition rate.

3. The method of claim 2, wherein the second repetition rate varies depending on the measured time periods.

4. The method of claim 1, wherein the first subscriber is the message receiver which receives the plurality of control messages from the message transmitter.

5. The method of claim 1, wherein the message receiver repeatedly sends heartbeat messages in order to signal to other subscribers of the network that the message receiver is still ready to receive, and wherein the request messages are included in the heartbeat messages.

6. The method of claim 1, wherein the second subscriber is the message transmitter that repeatedly send the control messages.

7. The method of claim 1, wherein the plurality of subscribers include a plurality of message transmitters sending a plurality of different control messages received by the message receiver, with the first subscriber monitoring the delay times of the plurality of different messages by measuring a plurality of different time periods and by comparing the plurality of different time periods with a plurality of threshold values.

8. The method of claim 1, wherein the plurality of subscribers comprise a plurality of message receivers, with each message receiver operating as first subscriber.

9. The method of claim 1, wherein only message receivers monitor the delay times of the control messages using a time out criterion.

10. The method of claim 1, wherein the message transmitter sends the control messages without any time stamps.

11. The method of claim 1, wherein the network is a switched Ethernet network, and wherein the subscribers send and receive the messages using Ethernet protocols.

12. A controller network for automatically controlling an installation, comprising:

a plurality of subscribers comprising a number of sensor devices, actuator devices and controllers controlling the actuator devices in response to messages from the sensor devices, with each subscriber acting at least as one of message transmitter and message receiver, and with at least one actuator device having an activated first state representing a hazardous situation and a deactivated rest state representing a non-hazardous situation, a message transmitter configured for sending control messages containing control data repeatedly within defined first time intervals, a message receiver configured for receiving the plurality of control messages and for monitoring delay times of the control messages using a time out criterion based on the first time intervals, a first subscriber configured for further monitoring the delay times by repeatedly sending a request message, a second subscriber configured for receiving the request message and for producing a response message in response thereto, wherein the first subscriber is configured for repeatedly measuring time periods between sending of the request message and receiving of the response message, wherein the first subscriber is configured for comparing the measured time periods with a defined threshold value, and for producing an error signal if a number of the measured time periods exceed the defined threshold value, and wherein the at least one actuator device is configured to enter into the deactivated rest state in response to the error signal.

13. A communication terminal for transmitting data in a controller network having a plurality of subscribers comprising a number of sensor devices, actuator devices and controllers controlling the actuator devices in response to messages from the sensor devices, with each subscriber acting at least as one of message transmitter and message receiver, and with the actuator devices having an activated first state representing a hazardous situation and a deactivated rest state representing a non-hazardous situation, the communication terminal being configured for:

receiving a plurality of control messages from a message transmitter and for monitoring delay times of the control messages using a time out criterion based on first time intervals, repeatedly sending request messages to the message transmitter, receiving response messages from the message transmitter issued in response to the request messages, measuring time periods between the sending of any request message and a reception of a response message from the message transmitter, comparing the measured time periods with a defined threshold value, and producing an error signal if a number of the measured time periods exceed the defined threshold value, with the error signal being adapted to cause the actuator devices to enter into the deactivated rest state.

14. A method for transmitting data in a controller network having a plurality of subscribers, which include at least one message transmitter and at least one message receiver, wherein the at least one message transmitter sends a plurality of messages within regular first time intervals, wherein the at least one message receiver receives the plurality of messages, wherein the at least one message receiver monitors a delay time of the messages using a time out criterion based on the regular time intervals, and wherein at least one of the subscribers further monitors the delay time of the messages by repeatedly sending a request message requesting a response message and by measuring a time period until the response message is received, said at least one subscriber comparing the measured time period with a predefined threshold value, and said at least one subscriber generating an error signal if the measured time period exceeds the predefined threshold value a predefined number of times.

15. The method of claim 14, wherein the at least one subscriber sends the request messages at predefined second time intervals, which are longer than the regular first time intervals.

16. The method of claim 15, wherein a length of the second time intervals varies as a function of the measured time periods.

17. The method of claim 14, wherein the at least one subscriber is the at least one message receiver.

18. The method of claim 14, wherein the plurality of subscribers include a plurality of message transmitters sending a plurality of messages received by the at least one message receiver, wherein the at least one subscriber monitors the delay times of the plurality of messages from the plurality of message transmitters by repeatedly sending a plurality of test messages to the plurality of message transmitters and by measuring a plurality of time periods until response messages are received.

19. The method of claim 14, wherein the plurality of subscribers comprises a plurality of message receivers, with each message monitoring the delay times by using a time out criterion, and by measuring time periods between sending of the request message and receiving of the response message.

20. The method of claim 14, wherein the at least one message transmitter sends the plurality of messages without time stamps.

* * * * *